Figure 1:
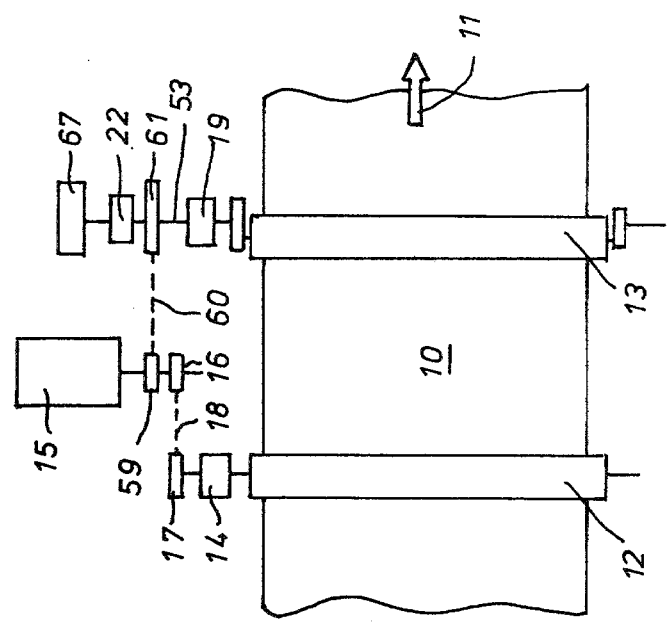

United States Patent [19]

Muylle et al.

[11] 4,333,372
[45] Jun. 8, 1982

[54] ROTARY CROSS-CUTTING APPARATUS FOR CUTTING CONTINUOUSLY MOVING WEBS

[75] Inventors: Wilfried E. Muylle, Schoten, Belgium; Heinz Kreiter, Darmstadt, Fed. Rep. of Germany

[73] Assignee: AGFA-GEVAERT N.V., Mortsel, Belgium

[21] Appl. No.: 175,588

[22] Filed: Aug. 5, 1980

[30] Foreign Application Priority Data

Aug. 7, 1979 [GB] United Kingdom ............... 7927497

[51] Int. Cl.³ ............................................. B23D 25/00
[52] U.S. Cl. ......................................... 83/324; 74/69
[58] Field of Search ............................... 83/324; 74/69

[56] References Cited

U.S. PATENT DOCUMENTS

| 1,115,000 | 10/1914 | Martin | 74/69 |
|---|---|---|---|
| 2,177,465 | 10/1939 | Sieg | 83/324 X |
| 3,308,701 | 3/1967 | Frohling | 83/324 |

FOREIGN PATENT DOCUMENTS 2657861 6/1978 Fed. Rep. of Germany ........ 83/324

*Primary Examiner*—James M. Meister
*Attorney, Agent, or Firm*—William J. Daniel

[57] ABSTRACT

A cutting apparatus with two cooperating rotatable cutting knives is driven by a driving shaft rotating at a constant speed and includes a speed controller in the form of an interlocking rotatable pin and slot drive connection, the input and output shafts of that connection offset from each other, and acceleration and deceleration compensating means including a compensating flywheel and an interlocking rotatable pin and slot drive connection having the input and output shafts offset from each other, the input shafts of both slot drive connections being coupled to the driving shaft, the output shafts of both of the connections being held against bodily movement while the input shafts are mounted for parallel bodily displacement, and means for adjusting the position of the input shafts of the slot drives. Preferably, the input shafts have a common axis of rotation.

8 Claims, 6 Drawing Figures

ROTARY CROSS-CUTTING APPARATUS FOR CUTTING CONTINUOUSLY MOVING WEBS

The present invention relates to a rotary cross-cutting apparatus suitable for cutting continuously moving webs into predetermined lengths.

In such cutting apparatus it is known to drive the cross-cutting knives through a speed controller which causes them to be driven at cyclically fluctuating speed. The objective is thereby achieved that the component of the speed of the knives in the direction of the web movement, at the moment of cutting, can be equal to the speed of the web while the average peripheral speed of the knives is higher or lower so that the length of the cut pieces of the web is not solely a function of the web speed.

In order to achieve a predetermined cutting length, the driving means from which power is taken for driving the knives should maintain a constant speed. There is a problem in fulfilling this condition because the power take-up tends to vary because of the acceleration and deceleration of the knives. This problem can be met by giving the driving means a substantially higher moment of inertia than that of the cutter mechanism, e.g. by the provision of a heavy flywheel. However, this requires that the supports and the driving shaft and bearings of the driving mechanism be rather massive form, and increases the time required for starting and stopping the machine.

It has been proposed to counter-balance fluctuations in the power take-up by the cutter mechanism by a rotating mass which is accelerated and decelerated in phase with the decelerations and accelerations respectively of the cutting mechanism so that the sum of the kinetic energies of the speed controller and the cutter mechanism on the one hand, and of the rotating counterbalancing mass on the other hand, remains constant. In these circumstances the counter-balance need not have such a large moment of inertia.

There is known from U.S. Pat. No. 2,211,418 of Karl W. Hallden, issued Aug. 13, 1940, a cross-cutting apparatus of the kind referred to, wherein the acceleration and deceleration of the cross-cutting knives, and the corresponding deceleration and acceleration of the counterbalancing mass is carried out by means of offset driving and driven shafts, each such shaft having a crank arm which is engaged with the other one that the driven shaft is rotated with a non-uniform motion. In order to adjust the length of the cut sheets, the offset distance between driving and driven shafts must be adjustable. This adjustability forms a problem in the known apparatus.

In one embodiment of the known apparatus, intermediate transmission shafts are provided between the driving and the driven shafts, and such intermediate shafts are coupled at either end by means of co-operating crank arms. The disadvantages of this mechanism are as follows. The total mass of the rotating parts is increased whereby the moment of inertia is increased, so that strains and stresses in the mechanism due to the non-uniform motion are correspondingly increased. The cinematic stiffness of the mechanism is reduced as a consequence of the several rotational couplings. The accuracy of the compensation depends on the accuracy of the mechanism that interlocks the positions of the bearings of the intermediate shafts.

In another embodiment, the format adjustment of sheets cut from the web is done by changing the angular relationship between the web cutters and the speed controller of the cutters. This second mechanism has the advantage that the moment of inertia is not notably increased. However, an important disadvantage of the mechanism is that it operates always and continuously at maximum non-uniformity. Thus, even for the so-called synchronous cutting, what means that the web is being cut while the web cutters rotate at a constant, peripheral speed that is equal to the web speed, the mechanism operates at the maximum degree of surge, with consequent strains and stresses in the mechanism, and resultant wear and inaccuracy. Since practice shows that up to 50% of all cuttings with the described apparatus are so-called synchronous cuttings, it is clear that the mentioned second mechanism is not entirely satisfactory.

It is the object of the present invention to provide a rotary cross-cutting apparatus wherein the moment of inertia of the parts that rotate at non-uniform speed is not increased by the adjustment mechanism, and wherein strains and stresses in the mechanism are dependent on the format setting of the sheets to be cut so that at synchronous cutting the load fluctuation of the mechanism is zero.

According to the present invention, a rotary cross-cutting apparatus for cutting a continuously moving web into predetermined length which comprises a web cutter which is mounted for cyclical movement towards and away from the cutting position, feed means for feeding the web to the web cutter, motor-operated driving means for driving the web cutter and feed means including a driving shaft which is adapted to be driven at constant speed by the motor means said driving shaft being coupled by coupling means to the cutter via a speed controller causing acceleration and deceleration of the cutter in each cycle, and to compensating means in the form of a compensating flywheel which serves to compensate for the fluctuating loading of the driving motor means due to the accelerations and decelerations of the cutter, said coupling means comprising first and a second crank arm mechanisms respectively which have a common input rotation axis and output rotation axes offset from said input rotation axis by an eccentricity $e_1$ for the first and $e_2$ for the second mechanism and and are 180° out-of-phase, is characterized means mounting the driving shaft for parallel displacement radially with respect to its axis and means for adjusting the position of said shaft in such radial direction thereby to vary the eccentricities $e_1$ and $e_2$.

The first and second crank arm mechanisms are preferably in the form of crank and slot drive mechanisms.

A crank and slot drive mechanism as known per se comprises driving and driven members mounted for rotation about parallel but spaced axes and having pin and slot engagement so that rotation of the driving member at uniform speed results in rotation of the driven member at a non-uniform speed. The driving and driven members may be in the form of arms or links. Alternatively one or both of them may be in the form of a disc. In apparatus according to the invention the driving member of each crank and slot drive mechanism can be in the form of a disc which at one side has a slot for receiving the follower, i.e. the pin. The pin can be rotatable in the slot or it can be shaped so as merely to be slideable along the slot provided of course that such pin is rotatable relative to the member by which it is carried.

The cutter may comprise one or more knives mounted for rotation about at least one axis spaced from the path of the web. For example there may be at least one such knife which is mounted on a rotatable carrier, e.g. a drum, so that the knife edge during operation describes a cylindrical surface of revolution.

Advantageously at least one of the knives is mounted for rotation about an axis spaced from the path of the web so that the knife edge receives rotational and rectilinear components of motion such that it travels substantially perpendicularly through the web at the cutting position. Such an arrangement will be exemplified later in this specification.

In certain apparatus according to the invention, the cutter comprises two opposed knives mounted for rotation on opposite sides of the web path their movements being synchronised so that they co-operate at the cutting position during each cycle.

In other embodiments of the invention, the cutter comprises a first knife rotably mounted for cyclical movement towards and away from the web path on one side thereof, and a second knife which is moved rectilinearly, parallel with the direction of movement of the web, on the other side of the web path, and which co-operates with the first knife at the cutting position.

In the cutting apparatus according to the invention, the motor means for driving the web cutter is preferably stationarily mounted, and the power transmission from the motor means to said driving shaft occurs via a displaceable connecting shaft which may comprise two universal joint couplings.

The eccentricities $e_1$ and $e_2$ are preferably equal to each other.

The slotted members of the crank and slot drive mechanisms are preferably directly driven by the driving shaft, and have the common input rotation axis as their axis of rotation.

Figure 2:
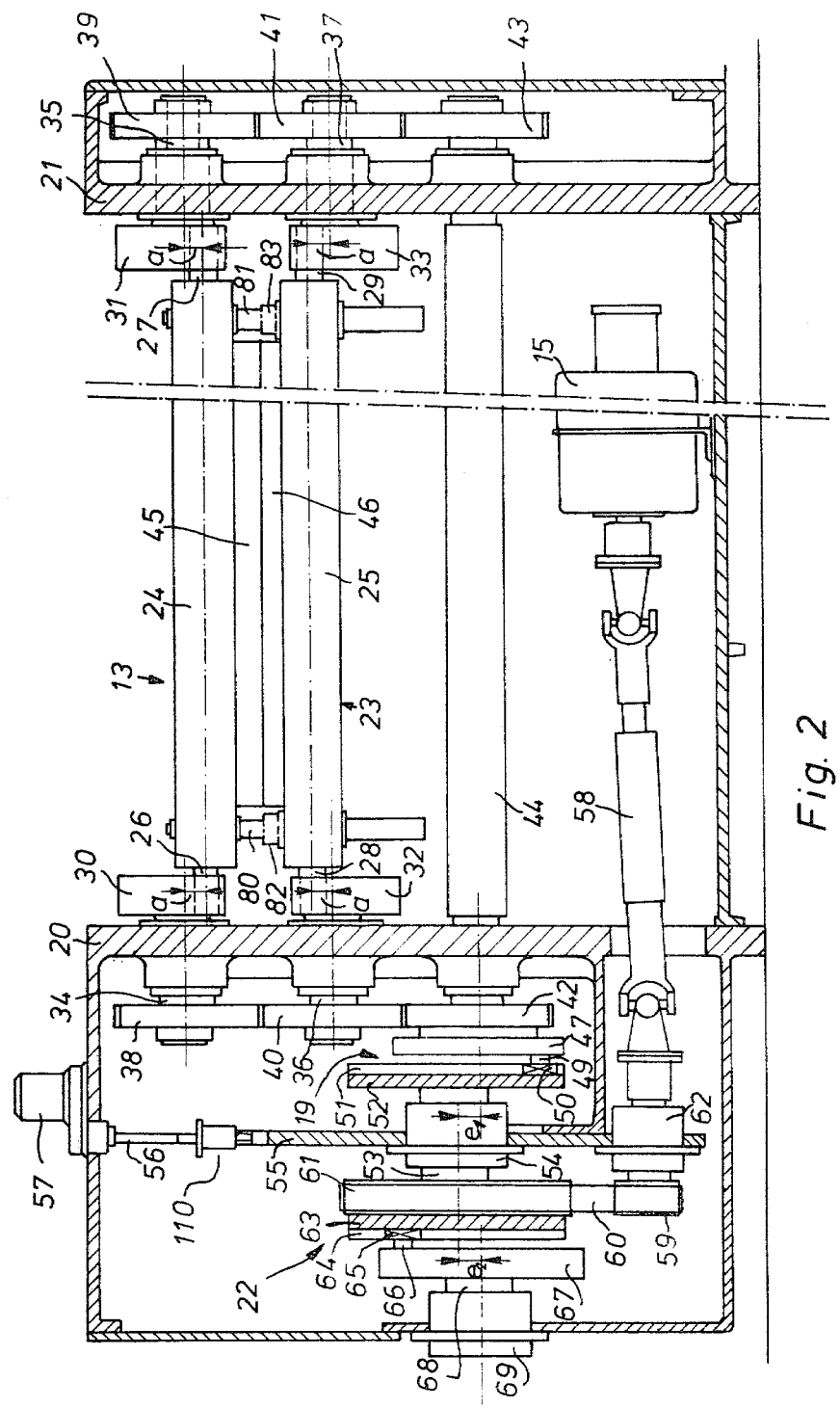
Figure 3:
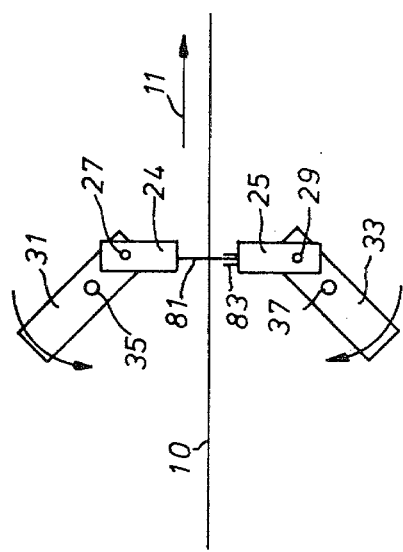
Figure 4:
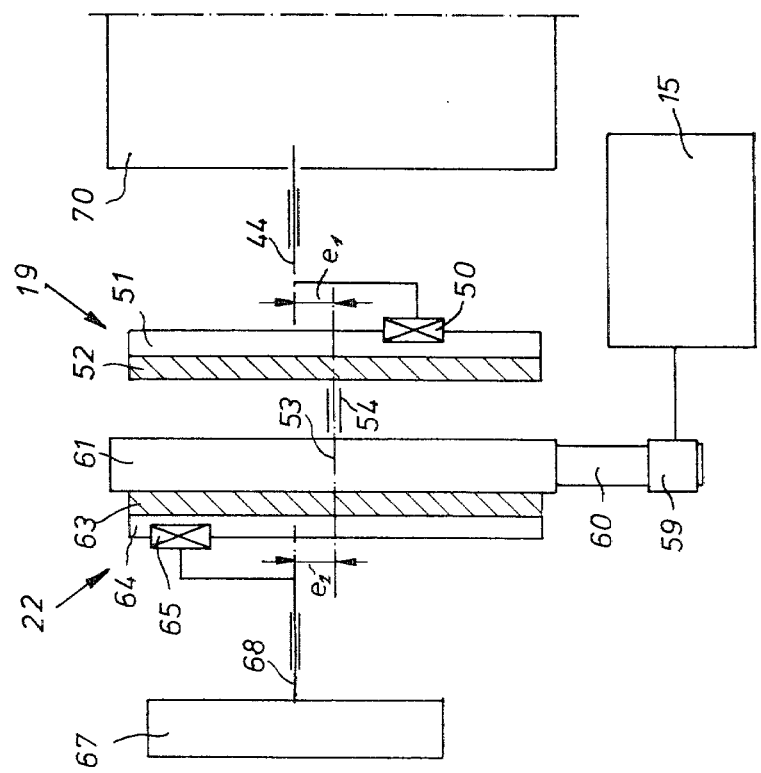
Figure 5:
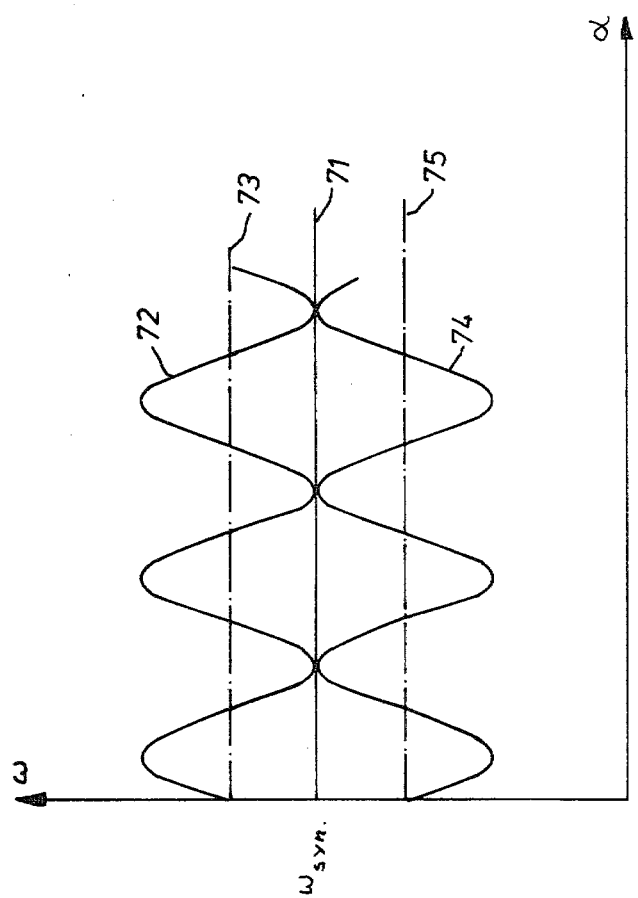
Figure 6:
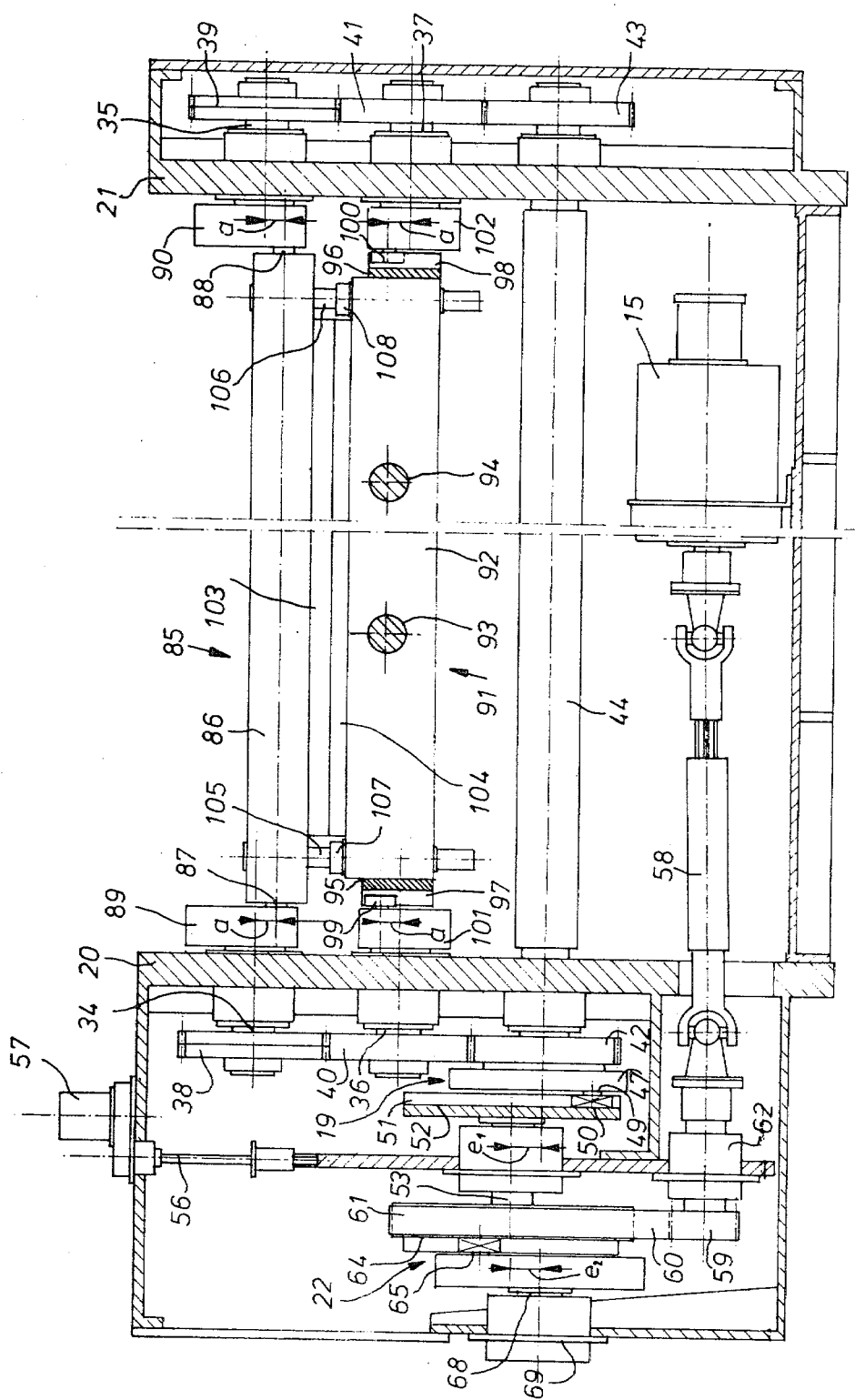

The invention will be described hereinafter by way of example with reference to the accompanying drawings, wherein:

FIG. 1 is a diagrammatic view of the apparatus drive,
FIG. 2 is a front elevation of the apparatus,
FIG. 3 is a diagrammatic view of the driving of the knife bars,
FIG. 4 is a diagrammatic view of the accompanying mechanism,
FIG. 5 is a diagram of the angular speed of the cutting knives, and
FIG. 6 is a front elevation of an apparatus embodying a different cutter mechanism.

Referring to FIG. 1 which represents diagrammatically the driving arrangement of the apparatus, a web 10 is moved at a constant speed in the direction of the arrow 11 by means of a pair of co-operating pressure rollers, only the upper roller 12 being illustrated in the drawing. The web 10 is cut into sheets by means of co-operating rotatable cutting knives, only the upper half 13 of the cutter mechanism being illustrated in the drawing.

The roller 12 is driven through a transmission box 14 with a continuously adjustable transmission ratio, for instance a Reeves drive, that in its turn is driven by a motor 15 through gears 16 and 17 and a timing belt 18 or the like.

The cutting mechanism is driven through gears 59, 61 and a timing belt 60, and a speed controller 19. The speed controller is an adjustable mechanism that is capable of varying the speed of the cutting knives during each revolution. The mechanism 22 constitutes with the flywheel 67 the compensation mechanism for the apparatus.

FIG. 2 illustrates more constructional details of the same apparatus. The apparatus comprises two rigid upstanding frames 20 and 21 in which the rotatable parts of the apparatus are journalled. The cutter mechanism comprises an upper and a lower half 13 and 23. The respective halves comprise the knife bars 24 and 25 which extend transversely of the horizontal path of a web between them, and which are rotatably journalled on pins 26, 27 and 28, 29 supported on arms 30, 31 and 32, 33 respectively. The arms are fitted to shafts 34, 35 and 36, 37. The shafts are coupled with each other through gears 38, 39 and 40, 41 which in turn are driven by the gears 42, 43 on a driving shaft 44.

The axes of the pins and arms are offset by a distance indicated by a so that the knife bars 24 and 25 will carry out opposed rising and lowering movements upon rotation of the arms whereby knife blades 45 and 46 which are mounted on the bars will carry out cutting movements at the moment both knife bars are approaching towards each other. In order to obtain a proper cutting by the knife blades, it is required that their planes should remain parallel during the cutting cycle. This is obtained by the aligning pins 80 and 81 that are fitted in the knife bar 24 and that slidingly engage bushes 82 and 83 of the knife bar 25. The pin-and-bush engagements prevent any rotation of the knife bars about their axes. During rotation of the shafts 34–37, the bars carry out a rectilinear movement which is superimposed upon the rotational movement. The rectilinear movement results from the eccentricity a between the axis of rotation of the bars 24, 25 and the axis of the shafts 34, 35 and 36, 37. FIG. 3 illustrates diagrammatically the driving control of the knife bars.

The purpose of the asymmetric form of the arms 30–33, whereby their mass is much greater at the side remote from the pins 26 to 29 than at the side adjacent said pins, is to compensate for the mass of the connected knife bars 24, 25 and knife blades 45, 46. Thereby the upper and lower halves of the cutter mechanism form balanced units whereby relatively high cutting speeds may be used without the introduction of excessive vibration and of heavy loads on the bearings of the mechanism.

The speed control mechanism 19 for imparting to the cutter mechanism a non-uniform speed that is superimposed on a uniform speed, is in the form of a crank and slot mechanism comprising the discs 47 and 52 (FIG. 2). The disc 47 is mounted on the left-hand extremity of the shaft 44 and has a pin 49 rigidly fitted to the disc with a slider 50 that is rotatable on the pin. The slider 50 slideably fits into a radial groove 51 of the disc 52 that is mounted on a shaft 53. The shaft 53 is rotatably journalled in a bearing 54 that is mounted in a sturdy plate 55 that is arranged for bodily vertical displacement in the frame 20. The vertical position of plate 55 is controlled by a screw spindle 56 that threadedly engages the plate 55 at the bushing 110, and that may be rotated by a motor 57. The axes of the shafts 44 and 53 run parallel with each other but are offset from each other by an eccentricity $e_1$.

The driving power for driving shaft 53 is taken from a power shaft 59 which is connected to a motor 15 via a universal joint coupling shaft 58. The power shaft is connected to driving shaft 53 by a timing belt 60 which engages a timing pulley 61 fixed to such shaft. The shaft of power shaft 59 is journalled in a bearing 62 that is mounted on the displaceable plate 55. At the outer surface of pulley 61 there is mounted co-axially therewith a disc 63 which is provided with a radial slot 64 and forms the driving member of a second crank and slot drive mechanism 22. In driving engagement with slot 64 is a slider 65 that is rotatably mounted on a pin 66 fixed on a compensating flywheel 67. This flywheel is mounted for free rotation with its shaft 68 in a bearing 69.

The moment of inertia of the compensating flywheel 67 preferably equals the moment of inertia of the cutter knives and the associated rotatable parts the speed of which is cyclically fluctuating. The axis of the flywheel shaft 68 is offset from the axis of the shaft 53 by an eccentricity $e_2$. The eccentricity $e_2$ preferably equals the offset distance of the axis of the shaft 44, namely $e_1$. The angular position of the slider 65 in the radial groove 64 is 180 degrees out-of-phone with respect to the angular position of the slider 50 in the groove 51. Operation of the motor 57 alters the vertical position of the plate 55 whereby the vertical position of the shaft 53 and consequently, the distance or distances $e_1$, $e_2$ by which its axis is offset with respect to the axes of shafts 68 and 44 may be adjusted from zero to a given maximum value. This adjustment may occur either upwardly or downwardly so that the position of the shaft 53 may be higher or lower than the position of the shafts 44 and 68.

The crank and slot drive mechanism 19 forms the speed controller of the apparatus while the crank and slot drive mechanism 22 forms the compensating control mechanism. The wheel 61 may have a relatively large mass whereby it may function as an input flywheel as will further be explained.

The operation of the apparatus will now further be explained with reference to FIG. 4 which is a diagrammatic illustration of the driving and compensating mechanism, the horizontal dash-and-dot lines representing the axis of the corresponding shafts, and to FIG. 5 which illustrates the angular speed of the cutter knives and the speed of the web.

If, contrary to what is shown in FIGS. 2 and 4, the vertical position of the bodily displaceable shaft 53 is adjusted so that the eccentricities $e_1$ and $e_2$ are zero, i.e. so that the shafts 68, 53 and 44 are co-axial, the angular speed of the cutter mechanism indicated as a whole at 70 is at all times equal to the angular speed of the driving wheel 61 and the compensating flywheel 67 is superfluous since there are neither acceleration nor deceleration forces that must be compensated. The cutting of the web occurs at synchronous speed, i.e. the web speed is equal to the constant peripheral speed of the knives 45 and 46.

If on the other hand the shaft 53 is eccentric with respect to shafts 44 and 68, the angular speed of the knives 45, 46 is not constant. The angular speed of the knives fluctuates in each cycle. The fluctuating speed characteristics are determined by the combination of a constant speed component equal to the speed of pulley 61, and a superimposed speed component which changes almost sinusoidally in a manner depending on the magnitude of the eccentricity $e_1$.

Referring to FIG. 5, the curve 72 represents one actual angular speed profile of the knives, the average angular knife speed per cycle being represented by line 73. Curve 74 represents another actual angular speed profile of the knives, the corresponding average angular knife speed per cycle being represented by line 75.

The knives must have the same linear speed as the web at each moment of cutting. Such moments are those at which the sinusoidal speed curve touches the line 71 in FIG. 5, line 71 representing $w_{syn}$, i.e. the angular speed of the knives at which equality exists between the web speed and the knife speed. The speed of the web at that moment may also be written as: $v = a \cdot w_{syn}$.

However, the average angular speed of the knives can be higher than $w_{syn}$ (as in the case of curve 72) or lower than $w_{syn}$ (curve 74). The pitch of either of the curves 72 and 74, measured along the abscissa, corresponds with 360 angular degrees, i.e. one revoluation of the knives. Whether a given $e_1$ eccentricity value will give an average angular knife speed higher or lower than $w_{syn}$ depends on whether the axis of driving shaft 53 is set higher or lower than the axis of shaft 44.

It will be understood that for each different setting of $e_1$ there is a corresponding setting of the ratio of the transmission box 14 in order that the speed of the web should correspond with the peripheral speed of the cutting knives at the moments of cutting.

The accelerations and decelerations of the cutting mechanism during each revolution necessitate a particular control of the driving means in order that the speed thereof shall not fluctuate because of variations in load entailed by the speed changes of the cutter mechanism.

This control is provided in the present apparatus by the compensating flywheel 67, the moment of inertia of which equal the moment of inertia of the cutter knives and of the associated parts. Since the sliding members 50 and 65 are phase-shifted over 180 angular degrees, it will be understood that an acceleration of the cutting mechanism 70 is accompanied by a deceleration of the compensating flywheel 67, and vice versa.

In spite of equality of the moments of inertia of the cutter mechanism and its associated parts of the compensation flywheel, a complete compensating of the acceleration and deceleration forces of the pulley 61, and thus also of the driving shaft 53, is not possible, since the law according to which the crank and slot drive mechanism operates deviates by approximately 3% from the true sine law. The feedback effect of the mentioned incomplete compensation may therefore be reduced by arranging the pulley 61 as an input flywheel. It may be shown that for a nearly complete damping operation, the moment of inertia of the input flywheel 61 should amount to 15 times the moment of inertia of the compensating flywheel 67. If the same damping were to be obtained without the inventive compensation mechanism with the crank and slot drive 64, 65 and the compensating flywheel 67, then the moment of inertia of the flywheel 61 would have to amount to approximately 120 times the moment of inertia of the cutting mechanism and its associated parts driven at cyclically fluctuating speed.

The following data illustrate a specific apparatus constructed in accordance with the described embodiment.

Cutting width: 1800 mm
Web speed: up to 100 m.min$^{-1}$
Web material: polyester with a thickness up to 120 μm
Length of cut sheets: from 210 to 420 mm
Width of cut sheets: from 210 to 420 mm
Moment of inertia of compensating flywheel 67: 2 kgm2

Mass of compensating flywheel 67: 100 kg
Moment of inertia of input flywheel 61: 30 kgm2
Mass of input flywheel 61: 240 kg.

The operation of the apparatus described so far is not limited to the cutting of a single web into successive sheets, it may also be, and even preferably is, used for cutting sheets from a plurality of strips that are located side by side and that are simultaneously fed through the cutting apparatus. In practice such strips result from the longitudinal slitting of a web into a plurality of narrower strips. Suchlike apparatus can advantageously be followed by a so-called sheet spreader. This is an apparatus that causes a longitudinal and/or lateral spreading of the distinct cut sheets so that the picking up and the stacking thereof are facilitated.

In FIG. 6, there is illustrated a cutting apparatus that comprises opposed rotary knives, the upper knife receiving rotational and rectilinear components of motion, and the lower knife receiving rectilinear components of motion only. The driving and compensation mechanisms of the apparatus are the same as in the apparatus illustrated in FIG. 2, and therefore they are given the same reference numerals as in that figure.

The upper half 85 of the cutter mechanism comprises a knife bar 86 which extends transversely of the horizontal path of a web through the apparatus, and which is rotatably journalled on pins 87 and 88 fitted to arms 89 and 90. The arms are fitted to the shafts 34 and 35. The axes of the pins 87 and 88 are offset from the axes of the shafts 34 and 35 by a distance a.

The lower half 91 of the cutter mechanism comprises a knife bar 92 which extends parallel with the bar 86, and which is arranged for horizontal displacement on two parallel supporting rods 93 and 94. The lateral ends of the bar 92 are provided with end blocks 95 and 96 wherein vertical slots 97 and 98 are provided. Sliders 99 and 100 that are rotatably fitted to arms 101 and 102 slidingly fit into the corresponding slots 97 and 98. The axes of rotation of the sliders 99 and 100 are offset from the axes of rotation of the arms by a distance a. Rotation of the shafts 34, 35, 36 and 37 causes the knife bar 86 to carry out a rotational displacement whereas the knife bar 92 carries out linear horizontal displacements in synchronism with the horizontal component of motion of the bar 86. In order to obtain a proper cutting by the knife blades 103 and 104 fitted to the respective bars, it is required that their planes should remain parallel during the cutting cycle. This is obtained by the pins 105 and 106 that are fitted to the knife bar 86 and that slidingly engage sleeves 107 and 108 of the knife bar 92. The pins prevent any angular displacement of the knife bar 86 out of the vertical plane during rotation of the arms 89, 90. Consequently the cutting edge of knife blade 103 accurately co-operates with the edge of the knife blade 104 as the former is moved into its lower position. Since the offset distances of the upper and lower halves of the cutting mechanism are equal to each other, namely the distance a, the horizontal component of motion of the knife blade 103 is at any time equal to the horizontal motion of the knife blade 104.

The apparatus of FIG. 6 may offer advantages over the apparatus illustrated in FIG. 2.

In case the average speed of the cutter mechanism is lower than the transport speed of the web through the apparatus, see the line 75 in FIG. 5, it may happen that the front edge of a newly cut flimsy sheet abuts against the slowly advancing knife blades. The apparatus according to FIG. 6 makes it possible to take measures so that the front edge of such newly cut sheet remains free from the cutter blades after the cutting. Such measure may include the provision of a support, e.g. a conveyor belt or the like, in close proximity to the lower knife blade, for supporting the freshly cut front end of the web which would otherwise tend to flex downwardly.

A further advantage of the apparatus according to FIG. 6 is that the knife bar 92 need only have substantial stiffness in the horizontal direction, so that the mass of the bar may be smaller than the mass of the bar 25 in FIG. 2.

The apparatus according to the invention is not limited to the described embodiments.

The eccentricity $e_2$ may differ from the eccentricity $e_1$ but it will be understood that in that case a less satisfactory compensation will be obtained.

The crank and slot mechanisms may be arranged in reversed order. This means that the pin members 50 and 65 would be mounted on the common driving shaft 53 and the slotted members 52 and 63 on the corresponding shafts 44 and 68. However, the kinematic behaviour of such reverse arrangement is less favorable than the operation of the illustrated mechanism, and a less satisfactory compensation will be obtained.

The members 47, 52 and 63 may be of other than disc shape. For example they may be in the form of cranks, arms or links.

The members 52 and 63 may be discs having a substantial mass, thereby to operate also as input flywheels. In this way, they may supplement or take over the flypulley operation of the wheel 61.

The eccentricities $e_1$ and $e_2$ may also be situated in a horizontal rather than in a vertical plane, and in such case the displacement of the plate 55 for the adjustment of the mechanism should occur in a horizontal direction.

It will further be understood that the driving of the apparatus may also occur by two motors instead of by only one motor, one motor driving the web transporting rollers and the other motor driving the cutter mechanism. A synchronising device, e.g. an electronic interlocking circuit, is then required for maintaining a predetermined relation between the speeds of revolution of the two motors. The motor or motors driving the apparatus may also be hydraulic motors.

The function of the input flywheel 61 may also be taken over by the power shaft 59. The latter must then receive a moment of inertia which may be x-times smaller than the moment of inertia of the pulley 61, x being the transmission ratio between 59 and 61. It should be understood that in the latter case the timing belt 60 must be replaced by a more direct coupling, e.g. by a gear coupling.

Finally the cutting mechanism may as well comprise two knives fitted on counter-rotating drums, instead of knives which receive rotational, or rotational and rectilinear components of motion as described in the examples.

We claim:

1. A rotary cross-cutting apparatus for cutting a continuously moving web into adjustable predetermined lengths, said apparatus comprising a web cutter which is mounted for cyclical movement towards and away from the web path, feed means for feeding the web to said web cutter, motor means for driving said web cutter and said feed means, a driving shaft which is adapted to be driven at constant speed by said motor means and which is coupled to said cutter via a speed controller causing acceleration and deceleration of said cutter in each cycle, compensating means including a compensating flywheel which serves to compensate for the fluctuating loading of the driving shaft due to the acceleration and deceleration of said cutter, the driving shaft being coupled to the web cutter on the one hand and to the compensating means flywheel on the other hand by first and second crank arm mechanisms respectively, which have a common input rotation axis and separate output rotation axes offset from said input rotation axis by an eccentricity $e_1$ and $e_2$ respectively which are 180° out-of-phase relative to one another, means mounting said driving shaft for parallel bodily displacement transversely of its axis, and means for adjusting the bodily position of said driving shaft to vary the eccentricities $e_1$ and $e_2$.

2. A cutting apparatus according to claim 1, wherein the motor means for driving said web cutter is stationarily mounted, and the power transmission from said motor means to said driving shaft occurs via a shaft with universal joint couplings.

3. A cutting apparatus according to claim 1, wherein each of said first and second crank arm mechanisms comprises a crank and slot connection between separate rotating members.

4. A cutting apparatus according to claim 1, wherein $e_1 = e_2$.

5. A cutting apparatus according to claim 3, wherein the slotted members of both said crank and slot mechanisms are driven by the driving shaft and rotate about said common input rotation axis.

6. A cutting apparatus according to claim 1, wherein the moment of inertia of the compensating flywheel is equal to the sum of the moments of inertia of the cutter knives, driven at cyclically fluctuating speed.

7. A cutting apparatus according to claim 1, wherein an input flywheel is rotatably coupled with the driving shaft.

8. A cutting apparatus according to claim 7, wherein the moment of inertia of said input flywheel is at least 15 times the moment of inertia of the compensating flywheel.

* * * * *